United States Patent [19]
Eisenhardt

[11] 3,871,161
[45] Mar. 18, 1975

[54] SCALPER UNIT

[76] Inventor: Fred W. Eisenhardt, c/o Alloway Manufacturing, 610 University, Fargo, N. Dak. 58102

[22] Filed: May 3, 1973

[21] Appl. No.: 356,842

[52] U.S. Cl. ............................................ 56/121.46
[51] Int. Cl. ............................................. A01d 23/02
[58] Field of Search......... 56/121.4, 121.43, 121.46, 56/6

[56] References Cited
UNITED STATES PATENTS

| | | | |
|---|---|---|---|
| 2,663,986 | 12/1953 | Gransden | 56/121.4 |
| 2,852,902 | 9/1958 | Oppel | 56/121.4 |
| 3,599,403 | 8/1971 | Gantz | 56/6 X |
| R27,695 | 7/1973 | Barnes | 56/121.46 |

*Primary Examiner*—Louis G. Mancene
*Assistant Examiner*—J. N. Eskovitz

[57] ABSTRACT

A scalper unit operable to remove a portion of the top of row crops, as sugar beets. The scalper unit has an upright standard attached to a transverse tool bar with a clamp assembly. An arm pivotally mounted to the lower portion of the standard carries a support. A hydraulic motor mounted on the support carries a rotatable disc. The disc is held in fixed relation with respect to the top of the row crop with a shoe adjustably mounted on the arm. The hydraulic motor is operated at a speed independent of the ground speed of the unit.

29 Claims, 4 Drawing Figures

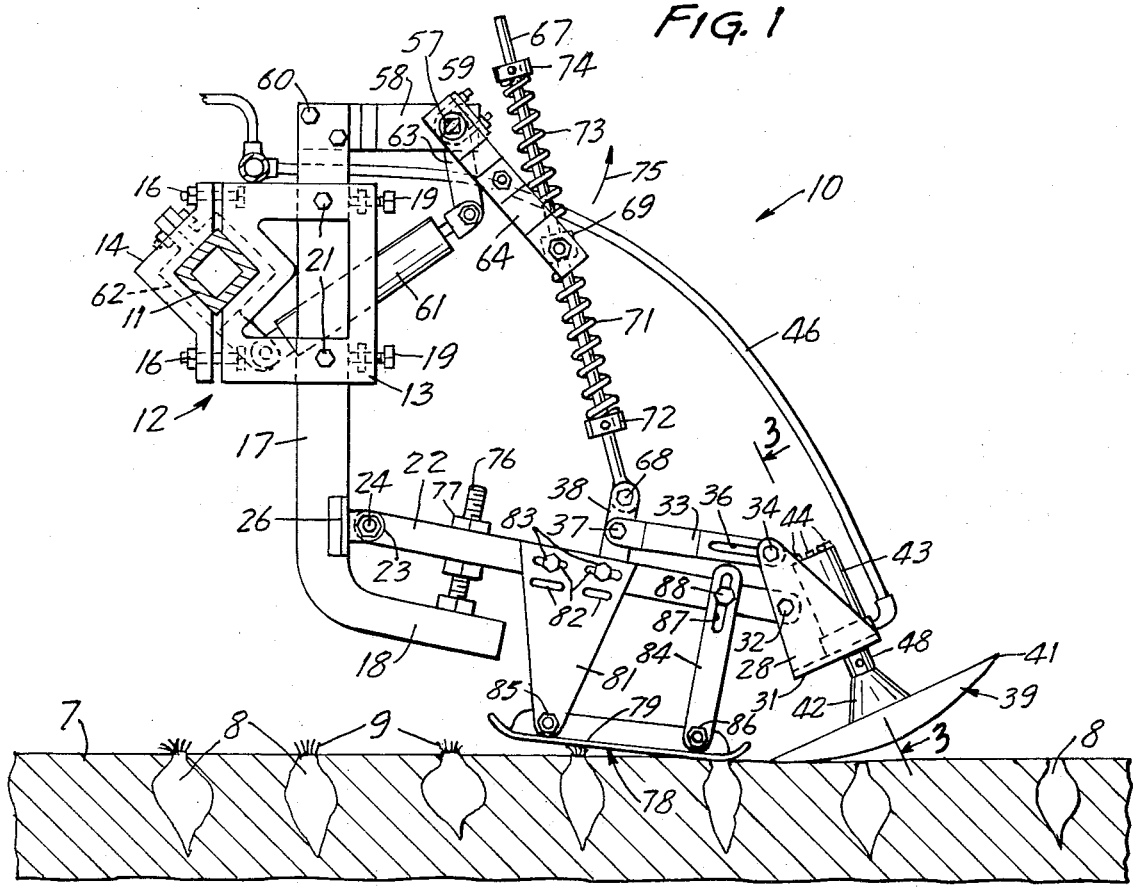

SCALPER UNIT

BACKGROUND OF THE INVENTION

Prior to the harvesting of sugar beets, the tops of the beets are removed with a defoliator and scalper implement. Eisenhardt et al in U.S. Pat. No. 3,583,136 disclose a defoliator having a scalper assembly. The scalper assembly has a plurality of rotatable discs. The discs are driven by a drive system connected to ground engaging wheels. Erhardt in U.S. Pat. No. 1,457,829 shows a disc for cutting beets driven via a ground engaging wheel. The speed of the scalping discs is in direct relationship to the ground speed of the implement. Heinz Oppel in U.S. Pat. No. 3,059,399 discloses a sugar beet topper having scalping discs driven with a power takeoff shaft connected to the mobile unit, such as a tractor. These scalper units are not effective in a wide range of soil conditions.

SUMMARY OF THE INVENTION

The invention is directed to a scalper assembly for removing the top of a root crop, as a sugar beet, while the root crop is in the soil. The scalper assembly has a standard adapted to be attached to a support. An elongated arm is pivotally connected to the standard for movement toward and away from the surface of the ground. Support connected to the arm carries a hydraulic motor. A disc means is driveably connected to the hydraulic motor whereby operation of the hydraulic motor rotates the disc means to cut the top portion of the root crop as the disc means is moved over the root crop.

An object of the invention is to provide a scalper assembly that is operated with a hydraulic motor carrying a disc means for cutting the top of a root crop. Another object of the invention is to provide a scalper assembly with a cutting disc means that is driven independently of the ground speed of the machine.

A further object of the invention is to provide a scalper assembly with a standard that is mounted in a clamp in a manner so that it can be adjusted laterally and vertically. A still further object of the invention is to provide a scalper assembly with a support carrying a hydraulic motor attached to a cutting disc which is adjustable to change the angle of a cutting disc without altering or changing the drive structure for the disc.

IN THE DRAWING

FIG. 1 is a side elevational view of the scalper assembly of the invention mounted on a transverse tool bar;

FIG. 2 is a top plan view of FIG. 1;

FIG. 3 is a sectional view taken along the line 3—3 of FIG. 1; and

FIG. 4 is an enlarged sectional view of the drive connection between the hydraulic motor and the stem connected to the cutting disc of the scalper assembly.

Referring to the drawing, there is shown in FIG. 1 ground or soil 7 containing a row of root crops 8, as sugar beets. Root crops 8 have tops 9 with substantially all of the foliage removed. The foliage can be removed with a rotary beeter implement, as shown in U.S. Pat. No. 3,583,136. The scalper unit operates to remove all of the foliage and a small portion of the top of the root crop.

The scalper assembly 10 is mounted on a transverse beam or tool bar 11 with a clamp 12. Claim 12 can be of the type disclosed in U.S. Pat. No. 3,642,333. Clamp 12 has a first member 13 in engagement with one side of beam 11 and a second member 14 engaging the opposite side of the beam. Nut and bolt assemblies 16 operatively connect members 13 and 14 to fix the position of the clamp 12 on the tool bar 11.

Clamp assembly 12 holds an upright standard 17. The lower portion of standard 17 has a rearwardly directed extension or leg 18. Longitudinal bolts 19 and transverse bolts 21 threaded through captive nuts in the clamp fix the position of the standard 17 relative to the clamp. Standard 17 can be vertically adjusted to change its elevation. A rearwardly directed arm 22 is located above and in general vertical alignment with the leg 18. Arm 22 is a linear channel member. The forward portion of arm 22 is pivotally mounted on the standard 17 with a bearing 23 and transverse pivot pin 24. Bearing 23 is attached to standard 17 with brackets 26.

A generally U-shaped support indicated at 27 is attached to the rear portion of arm 22. As shown in FIGS. 2 and 3, support 27 has upright side members 28 and 29 and transverse base 31. A pair of pivot bolts 32 secure the mid-section of side members 28 and 29 to the arm 22. The upper ends of side members 28 and 29 are connected to forwardly directed links 33 with nut and bolt assemblies 34 which function as pivotal connectors joining the links to the side members. The links 33 have longitudinal slots 36 to permit angular adjustment of the support 27 relative to arm 22. The forward portions of links 33 carry a transverse pivot bolt 37 extended through a fixed upright member or projection 38. Projection 38 is secured to the top mid-portion of arm 22.

A generally pan-shaped disc 39 is located below support 27. Disc 39 has a generally concave shape with a circular outer peripheral cutting edge 41. The disc 39 is attached to an upwardly directed stem 42. Stem 42 has a downwardly extended cone-shaped body secured to the disc with bolts 44. A fluid motor 43, as a hydraulic motor, is located within the U-shaped support 27 and attached to the base 31 with bolts 46. The motor 43 can be a hydraulic orbit motor, as shown in U.S. Pat. No. Re. 25,291. Fluid motor 43 is connected to an inlet hydraulic line 46 and an exhaust hydraulic line 47. Hydraulic fluid from a source as a pump or the tractor moving the scalper assembly operates to supply the motor 43 with hydraulic fluid under pressure. The fluid functions to drive the motor 43 and thereby rotate the discs 39 in the direction of arrow 45, as shown in FIG. 2. The fluid supplied to the hydraulic motor is not related to the ground speed of the vehicle. The hydraulic motor can be driven at varying speeds, depending on soil conditions and the amount of material to be removed from the root crop.

Referring to FIG. 4, stem 42 has an upwardly directed head 48 with a bore 49 for accommodating the downwardly directed shaft 51 of the motor 43. The shaft and head have longitudinal keyways accommodating a key 52. A set screw 53 in head 48 hold the key in assembled relation with the head and shaft. A transverse drive pin 54 extends through the head 48 and pin 51.

Located adjacent the tip end of standard 17 is a transverse lift shaft 57. Lift shaft 57 extends through rearwardly directed arms 58 carrying bearings 59. The forward portions of arms 58 are secured with bolts 60 at the top of standard 17. A plurality of arms 58 support shaft 57. The lift shaft is rotated with hydraulic cylinder 61. One end of cylinder 61 is connected with clamp 62 to the beam 11. The opposite end of cylinder 61 is attached to a downwardly directed leg 63 connected with a clamp or suitable connecting structure to the lift shaft 57. The cylinder 61 is extended to raise arm 22. A downwardly directed yoke member 64 is fixed to the lift shaft 57 adjacent the arm 58. A U-bolt 66 fixes member 64 to the shaft so that member 64 will rotate with shaft 57. A downwardly directed rod 67 is connected at its lower end with a pivot member to the top of projection 38. A block 69 having a hole slideably accommodates rod 67. The block 69 is attached to the lower rear end of member 64. A first spring 71 is located between block 69 and a stop 72 secured to rod 67. A second spring 73 is located between block 69 and a stop 74 secured to the upper end of rod 67. On operation of hydraulic cylinder 61 the member 64 moves in an upward direction, as indicated by arrow 75 in FIG. 1, and thereby raises arm 22. The contraction of hydraulic cylinder 61 lowers arm 22 until a stop bolt 76 engages the top of extension 18. Nuts 77 clamp bolt 76 on arm 22 and adjust the position of bolt 76 on arm 22.

A shoe assembly indicated generally at 78 is located in front of disc 39. Show assembly 78 has a generally flat base or sole plate 79 that rides on the beet tops. A pair of upwardly directed front legs 81 secure the plate 79 to arm 22. Fasteners 82 connect the lower portions of legs 81 to upwardly directed ribs on the sole plate. The upper portions of legs 81 have horizontal slots 82. A pair of fasteners 83 extended through slots 82 connect the legs to arm 22. Slots 82 permit longitudinal adjustment of the legs on arm 22. A pair of rear legs 84 are connected with fasteners 86 to the rear portion of the sole plate 79. The upper ends of legs 84 have upwardly directed slots 87. Fasteners extended through slots 87 attach the legs to the arm 22. The vertical adjustment of the rear portion of the sole plate 79 permits adjustment of the elevation between the forward edge of the disc 39 and the rear portion of sole plate 79. This permits adjustment of the amount of the top of the root crop that is removed by the disc.

In use, the scalper assembly 10 is moved over the ground along a row of root crops, as sugar beets. The sole plate 79 rides on top of beets and functions as a gauge to guide disc 39 into cutting relation with the top section of the beets. The disc 39 is rotated at a selected speed with a hydraulic motor 43. The rotation speed of disc 39 is independent of the forward motion of the scalper assembly and is adjusted according to the conditions of the soil and beets. The angle of the disc relative to the horiztontal can be adjusted by merely changing the location of the upper portion of the support 27 relative to the links 33. The hydraulic connections do not have to be altered as the hydraulic lines 46 and 47 are flexible. The cutting disc 39 and shoe assembly 78 can be raised to a transport position. This is accomplished by actuation of hydraulic cylinder 61. Cylinder 61 will move member 64 in an upward direction, as indicated by arrow 75. The rod 67 functions as a suspension member to move the arm 22 in an upward direction and thereby elevate disc 39 and shoe 78.

The scalper assembly is used in a machine having a plurality of scalper discs, as shown in U.S. Pat. No. 3,583,136. The hydraulic motors 43 for each of the scalper assemblies can be connected in series or parallel and derive their source of hydraulic fluid under pressure from a common source. While there has been shown and described a preferred embodiment of the scalper assembly, it is understood that changes and substitutions can be made by those skilled in the art without departing from the spirit of the invention.

The embodiments of the invention in which an exclusive property or privilege is claimed are defined as follows:

1. A scalper assembly for removing the top portion of a root crop in the ground comprising: a standard adapted to be attached to a beam; an elongated arm; means pivotally connecting the arm to said standard for movement toward and away from the surface of the ground; a support connect to the arm; hydraulic motor means mounted on the support; said support including a generally U-shaped member, said hydraulic motor means being located within the U-shaped member, means pivotally connecting the U-shaped member to the arm; means to fix the pivotal position of the U-shaped member relative to the arm; and disc means connected to said hydraulic motor means whereby operation of said hydraulic motor means rotates the disc means to cut the top portion of the root crop as the disc means moves over the root crop.

2. The scalper assembly of claim 1 including: a shoe assembly secured to said arm forward of the disc means.

3. The scalper assembly of claim 2 including: means to adjustably mount the shoe assembly on the arm whereby the position of the shoe assembly to the disc means can be adjusted.

4. The scalper assembly of claim 1 wherein: the disc means includes a downwardly directed stem driveably connected to the hydraulic motor means, and a disc mounted on said stem.

5. The scalper assembly of claim 1 wherein: the standard has a rearwardly extended lower extension, said air having a stop means engageable with said extension to limit the downward movement of said arm.

6. The scalper assembly of claim 1 wherein: said standard has an upright member adapted to be mounted in a clamp for generally upright adjustment.

7. The scalper assembly of claim 1 including: means connected to the arm to raise the arm to a transport position.

8. The scalper assembly of claim 7 wherein: said means to raise the arm comprises a trnasverse lift shaft, means rotatably mounting the lift shaft on the upper end of the standard, power means for rotating said lift shaft, and means connecting said lift shaft with said arm whereby on operation of said power means said lift shaft is rotated in a direction to raise said arm.

9. The scalper assembly of claim 1 wherein: said disc means comprises a stem having an outwardly and downwardly directed cone-shaped, body, and a concave disc, and means connecting the disc to the lower portion of said cone-shaped body.

10. A scalper assembly for removing the top portion of a root crop in the ground comprising: a standard adapted to be attached to a beam; an elongated arm; means pivotally connecting the arm to said standard for movement toward and away from the surface of the ground; a support; means pivotally connecting the support to the arm; means to adjust and hold the pivotal position of the support relative to the arm; hydraulic motor means mounted on the support; and disc means connected to said hydraulic motor means whereby operation of said hydraulic motor means rotates the disc means to cut the top portion of the root crop as the disc means moves over the root crop.

11. The scalper assembly of claim 10 wherein: the support is a generally U-shaped member, said hydraulic motor means being located within the U-shaped member.

12. The scalper assembly of claim 10 wherein: the disc means includes a downwardly directed stem drivably connected to the hydraulic motor means, and a disc mounted on said stem.

13. The scalper assembly of claim 10 wherein: the standard has a rearwardly extended extension, said arm having a stop means engageable with said extension to limit the downward movement of said arm.

14. The scalper assembly of claim 10 including: a shoe assembly secured to said arm forward of the disc means.

15. The scalper assembly of claim 10 wherein: said disc means comprises a stem having an outwardly and downwardly directed coneshaped body, a concave disc, and means connecting the disc to the lower portion of said cone-shaped body.

16. A scalper assemly for removing the top portion of a root crop in the ground comprising: a standard adapted to be attached to a beam; an elongated arm; means pivotally connecting the air to said standard for movement toward and away from the surface of the ground; said standard having a rearwardly extended lower extension; said arm having stop means engageable with said extension to limit the downward movement of said arm; a support connected to the arm; hydraulic motor means mounted on the support; and disc means connected to said hydraulic motor means whereby operation of said hydraulic motor means rotates the disc means to cut the top portion of the root crop as the disc means moves over the root crop.

17. The scalper assembly of claim 16 wherein: the support is a generally U-shaped member, said hydraulic motor means being located within the U-shaped member.

18. The scalper assembly of claim 17 including: means pivotally connecting the U-shaped member to the arm, and means to fix the pivotal position of the U-shaped member relative to the arm.

19. The scalper assembly of claim 16 wherein: the disc means includes a downwardly directed stem drivably connected to the hydraulic motor means and a disc mounted on said stem.

20. The scalper assembly of claim 16 including: means pivotally connecting the support to the arm. and means to adjust and hold the pivotal position of the support relative to the arm.

21. The scalper assembly of claim 16 wherein: said standard has an upright member adapted to be mounted in a clamp for general upright adjustment.

22. The scalper assembly of claim 16 including: means connected to the arm to raise the arm to a transport position.

23. The scalper assembly of claim 16 including: a shoe assembly secured to said arm forward of the disc means.

24. The scalper assembly of claim 23 including: means to adjustably mount the shoe assembly on the arm whereby the position of the shoe assembly to the disc means can be adjusted.

25. The scalper assembly of claim 16 wherein: said disc means comprises a stem having an outwardly and downwardly directed cone-shaped body, a concave disc, and means connecting the disc to the lower portion of said cone-shaped body.

26. A scalper assembly for removing the top portion of a root crop in the ground comprising: a standard adapted to be attached to a beam; an elongated arm; means pivotally connecting the arm to said standard for movement toward and away from the surface of the ground; means connected to the arm to raise the arm to a transport position, said means to raise the arm comprising a transverse lift shaft; means rotatably mounting the lift shaft on the upper end of the standard; power means for rotating said lift shaft, and means connecting said lift shaft with said arm whereby on operation of said power means said lift shaft is rotated in the direction to raise said arm; a support connected to the arm; hydraulic motor means mounted on the support; and disc means connected to said hydraulic motor means whereby operation of said hydraulic motor means rotates the disc means to cut the top portion of the root crop as the disc means moves over the root crop.

27. The scalper assembly of claim 26 wherein: the support includes a generally U-shaped member, said hydraulic motor means being located within the U-shaped member.

28. The scalper assembly of claim 27 including: means pivotally connecting the U-shaped member to the arm, and means to fix the pivotal position of the U-shaped member relative to the arm.

29. The scalper assembly of claim 26 wherein: the standard has a rearwardly extended extension, said arm having a stop means engageable with said extension to limit downward movement of said arm.

* * * * *

UNITED STATES PATENT OFFICE
CERTIFICATE OF CORRECTION

PATENT NO. : 3,871,161
DATED      : March 18, 1975
INVENTOR(S) : Fred W. Eisenhardt It is certified that error appears in the above-identified patent and that said Letters Patent are hereby corrected as shown below:

Column 2, line 62, "tip" should be --top--.

Column 3, line 24, "Show" should be --Shoe--.

Claim 1, line 6, "connect" should be --connected--.

Claim 5, line 3, "air" should be --arm--.

Claim 8, line 2, "trnasverse" should be --transverse--.

Claim 13, line 2, after "extended", --lower-- is omitted.

Claim 16, line 1, "assemly" should be --assembly--.

Claim 16, line 4, "air" should be --arm--.

Claim 29, line 2, after "extended", --lower-- is omitted.

Signed and Sealed this twenty-second Day of July 1975

[SEAL]

Attest:

RUTH C. MASON
*Attesting Officer*

C. MARSHALL DANN
*Commissioner of Patents and Trademarks*